United States Patent
Yamamura et al.

[19]

[11] Patent Number: 6,156,455
[45] Date of Patent: Dec. 5, 2000

[54] METHOD FOR PRODUCING POSITIVE ELECTRODES OF ALKALINE STORAGE BATTERIES

[75] Inventors: Yasuharu Yamamura, Kanazawa; Masumi Katsumoto, Kamakura; Hideo Kaiya, Chigasaki, all of Japan

[73] Assignee: Matsushita Electric Industrial Co., Ltd., Osaka-Fu, Japan

[21] Appl. No.: 09/095,952

[22] Filed: Jun. 11, 1998

Related U.S. Application Data

[62] Division of application No. 08/748,940, Nov. 14, 1996.

[30] Foreign Application Priority Data

Nov. 16, 1995 [JP] Japan ................................ 7-298051
Sep. 3, 1996 [JP] Japan ................................ 8-232730

[51] Int. Cl.[7] .................................................. H01M 4/52
[52] U.S. Cl. ............................ 429/223; 429/206; 429/232
[58] Field of Search ...................... 429/232, 223, 429/206; 423/21.1, 593, 636

[56] References Cited

U.S. PATENT DOCUMENTS

| | | | |
|---|---|---|---|
| 4,215,190 | 7/1980 | Ferando et al. | 429/222 |
| 4,546,058 | 10/1985 | Charkey et al. | 429/223 |
| 4,567,101 | 1/1986 | David et al. | 428/364 |
| 4,844,948 | 7/1989 | Nakahori et al. | 497/126.3 |
| 4,985,318 | 1/1991 | Ohshitani et al. | 429/223 |
| 5,079,110 | 1/1992 | Nakahori et al. | 429/206 |
| 5,393,616 | 2/1995 | Mori et al. | 429/59 |
| 5,466,543 | 11/1995 | Ikoma et al. | 429/59 |
| 5,466,546 | 11/1995 | Pensabene et al. | 429/223 |
| 5,508,121 | 4/1996 | Sawa | 429/59 |
| 5,569,563 | 10/1996 | Ovshinsky et al. | 429/223 |
| 5,571,636 | 11/1996 | Ohata et al. | 429/218 |
| 5,660,952 | 8/1997 | Yano et al. | 429/223 |
| 5,766,789 | 7/1998 | James et al. | 429/44 |

FOREIGN PATENT DOCUMENTS

| | | |
|---|---|---|
| 0 634 804 A1 | 1/1995 | European Pat. Off. |
| 0 658 947 A1 | 6/1995 | European Pat. Off. |
| 1-200555 | 8/1989 | Japan . |
| 7-169466 | 7/1995 | Japan . |
| 8-264177 | 10/1996 | Japan ............ H01M 4/32 |
| WO 94/11910 | 5/1994 | WIPO . |

OTHER PUBLICATIONS

Edith Schleitzer–Steinkopf, Gmelins Handbuch der anorganischen Chemie, 8th Ed., Part C1, pp. 201–204, (1973) (no month available).

*Primary Examiner*—Carol Chaney
*Attorney, Agent, or Firm*—Akin, Gump, Strauss, Hauer & Feld, L.L.P.

[57] ABSTRACT

The present invention provides an alkaline storage battery comprising a positive electrode containing a nickel hydroxide active material and a compound oxide in a range of 2 wt % to 30 wt % to the amount of the nickel hydroxide. The compound oxide contains at least one transition metal element and at least one rare earth element or alkaline earth metal element. The compound oxide has conductivity of $10^{-2}$ S/cm or higher at 25° C. and stability in an alkaline electrolyte. Consequently, the alkaline storage battery shows excellent characteristics in a long-term preservation at a high temperature, capacity restoration, and charge/discharge cycle life.

3 Claims, 7 Drawing Sheets

$CaTiO_{3-x}$ $La_y Sr_{1-y} CoO_{3-x}$  $y \approx 0.5$ $La_y Ca_{1-y} MnO_{3-x}$  $y \approx 0.8$ $YBa_2Cu_3O_7$ $Na_xCoO_2$   $X \approx 0.8$ $Li_xCoO_2$   $X \approx 0.8$

METHOD FOR PRODUCING POSITIVE ELECTRODES OF ALKALINE STORAGE BATTERIES

CROSS REFERENCE TO RELATED APPLICATION

This application is a division of copending application Ser. No. 08/748,940, filed Nov. 14, 1996, entitled Alkaline Storage Battery and Method for Producing Positive Electrode Thereof, the entire disclosure of which is incorporated herein by reference.

BACKGROUND OF THE INVENTION

1. Field of the Invention

The present invention relates to alkaline storage batteries and nickel positive electrodes in the alkaline storage batteries, and more particularly, to a paste-type nickel positive electrode suitable for a nickel-cadmium storage battery, a nickel-metal hydride storage battery, and a nickel-zinc storage battery and a method for producing the positive electrode thereof.

2. Description of the Related Art

Alkaline storage batteries such as nickel-cadmium storage batteries and nickel-metal hydride storage batteries are highly reliable and capable of being miniaturized. For these advantages, they are used both as the power sources of portable appliances and industrial power sources, depending on their sizes. In this type of alkaline storage batteries, sintered-type or paste-type nickel electrodes are used.

Generally, a paste-type nickel positive electrode is manufactured as follows. Firstly, a nickel hydroxide powder synthesized by mixing a sodium hydroxide aqueous solution and an aqueous solution containing a nickel salt as its main component. Thus obtained nickel hydroxide powder is mixed with a cobalt powder, a cadmium powder, or another such powder. Then, a binder and water are added to and mixed with the mixture to obtain a paste. Finally, the paste is applied to a porous substrate so as to obtain a nickel positive electrode. The paste-type nickel electrode thus manufactured has a higher energy density than the sintered-type nickel electrode.

The electric conductivity of nickel hydroxide acting as an active material is as low as about $10^{-14}$ S/cm when the valence of nickel is 2. However, it can be $10^{-2}$ S/cm or higher when the valence of nickel becomes larger through oxidation.

The electrochemical oxidation of nickel in nickel hydroxide from divalence to trivalence can be achieved with comparative ease. On the other hand, the electrochemical reduction from trivalence to divalence is very difficult because the electric conductivity of nickel hydroxide suddenly drops when the valence of nickel becomes 2.2 or lower. Consequently, the upper limit of the utilization rate of nickel hydroxide is about 80%.

In order to increase the utilization rate of nickel hydroxide, metallic cobalt or a cobalt compound such as cobalt hydroxide and cobalt oxide is added to the positive electrode, and as a result, the utilization rate is raised to nearly 100%. The reason for the increase in the utilization rate is that the metallic cobalt or the cobalt compound is converted during charge of a battery, through oxidation, into cobalt oxyhydroxide, which is conductive high-order oxide, forming a conductive network.

However, when the electric potential of the nickel positive electrode has fallen to 1.0 V or lower against the potential of the cadmium negative electrode or the hydrogen storage alloy negative electrode, the cobalt oxyhydroxide, which is conductive and in a high-order oxidation state, is converted into a cobalt compound having divalent cobalt, which is soluble in the electrolyte. Thus, when the voltage of an alkaline storage battery has decreased during a discharge process or a long-term preservation at a high temperature, the cobalt in the nickel positive electrode is either reduced in amount or localized. This reduction or localization of cobalt decreases the electric conductivity among nickel hydroxide active material particles, thereby deteriorating the utilization rate of the nickel hydroxide. In order to prevent the deterioration of the utilization rate, a conductive agent such as metallic nickel powder or a carbon powder which is stable in an alkaline electrolyte and has a high conductivity, may be added to the positive electrode. However, the use of these conductive agents has a problem that if the charge/discharge process of the battery is executed at a high temperature of 45° C., the conductive agents are oxidized and gradually lose their conductivity.

SUMMARY OF THE INVENTION

In view of the foregoing problem, the present invention provides an alkaline storage battery which shows an excellent performance at high temperatures.

The present invention provides an alkaline storage battery comprising a positive electrode, a negative electrode and an electrolyte of an alkaline aqueous solution, wherein the positive electrode contains nickel hydroxide as an active material and a compound oxide having an electric conductivity of not less than $10^{-2}$ S/cm at 25° C. and a stability against the alkaline aqueous solution, the positive electrode containing the compound oxide by 2–30 wt % to the amount of the nickel hydroxide.

The present invention further provides an alkaline storage battery comprising a positive electrode, a negative electrode and an electrolyte of an alkaline aqueous solution, wherein the positive electrode contains nickel hydroxide as an active material and a compound oxide by 2–30 wt % to the amount of the nickel hydroxide, the compound oxide containing at least one transition metal element, and at least either a rare earth element or an alkaline earth metal element.

It is preferable that the compound oxide further contains an alkali metal element.

The present invention further provides an alkaline storage battery comprising a positive electrode, a negative electrode and an electrolyte of an alkaline aqueous solution, wherein the positive electrode contains nickel hydroxide as an active material and a compound oxide containing at least one transition metal element and at least one alkali metal element by 2–30 wt % to the amount of the nickel hydroxide.

It is preferable that the compound oxide is a powder having an average particle diameter of not larger than 5 μm. It is further preferable that the compound oxide is an aggregate or a sintered body, and has a columnar shape or fibrous shape.

A method for producing a positive electrode of an alkaline storage battery of the present invention comprises the steps of:

preparing a solution in which at least one salt of transition metal element and at least either salt of a rare earth element or an alkaline earth metal element are dissolved;

adding, to the solution, at least one alkaline solution selected from the group consisting of an alkali hydroxide solution, an alkali carbonate solution and an alkali bromide solution so as to synthesize a mixture containing a hydroxide, a carbonate or a bromide of the elements;

sintering the mixture so as to synthesize a compound oxide of the elements;

preparing a cathode mixture containing nickel hydroxide as an active material and the compound oxide by 2–30 wt % to the amount of the nickel oxyhydroxide; and applying the cathode mixture to a substrate for supporting the substrate.

Another method for producing a positive electrode of an alkaline storage battery of the present invention comprises the steps of:

dipping an oxide or a hydroxide of at least one transition metal element, and an oxide or a hydroxide of at least either one element of a rare earth element or an alkaline earth metal element into an aqueous solution in which at least one hydroxide of an alkali metal element is dissolved;

synthesizing a compound oxide by heating the aqueous solution to 100 to 700° C. under a circumstance of being isolated or an oxidizing gas so as to conduct a hydrothermal reaction; and applying a mixture containing nickel hydroxide and the compound oxide by 2–30 wt % to the amount of the nickel hydroxide to a substrate for supporting the substrate.

Another method for producing a positive electrode of an alkaline storage battery in the present invention comprises the steps of:

forming a layer of an oxide or a hydroxide of a transition metal element on a surface of nickel hydroxide;

dipping the nickel hydroxide and at least one oxide or one hydroxide of a transition metal element or an alkaline earth metal element into an aqueous solution in which at least one alkali metal element hydroxide is dissolved;

forming a compound oxide layer on the nickel hydroxide by heating the aqueous solution to 100 to 700° C. under a circumstance of being isolated or an oxidizing gas so as to conduct a hydrothermal reaction; and applying a mixture containing the nickel hydroxide having the compound oxide layer to a substrate for supporting the substrate.

It is preferable that the method further comprises the step of coating the nickel hydroxide with the oxide or the hydroxide of the transition metal element before the dipping step.

The hydrothermal reaction can be conducted after forming a layer of such element on the nickel hydroxide.

Another method for producing a positive electrode of an alkaline storage battery of the present invention comprises the steps of:

applying nickel hydroxide as an active material to a substrate for supporting the substrate;

dipping the substrate into an aqueous solution in which at least one transition metal element salt and at least either one salt of a rare earth element or an alkaline earth metal element are dissolved; and synthesizing a compound oxide on a surface of the nickel hydroxide by conducting an electrolytic oxidation until the amount of the compound oxide be 2–30 wt % to the amount of the nickel hydroxide.

Another method for producing a positive electrode of an alkaline storage battery of the present invention comprises the steps of:

mixing nickel hydroxide as an active material and at least one oxide or one hydroxide of a transition metal element;

applying the mixture to a substrate for supporting the substrate;

dipping the substrate into an aqueous solution in which at least either one salt of rare earth element or one alkaline earth metal element is dissolved; and synthesizing a compound oxide on a surface of the nickel hydroxide by conducting an electrolytic oxidation.

Another method for producing a positive electrode of an alkaline storage battery of the present invention comprises the steps of:

mixing nickel hydroxide as an active material and at least either one oxide or one hydroxide of a rare earth element or an alkaline earth metal element;

applying the mixture to a substrate for supporting the substrate;

dipping the substrate into an alkaline aqueous solution; and synthesizing a compound oxide layer on a surface of the nickel hydroxide by conducting an electrolytic oxidation.

It is possible to dip the substrate and to conduct the electrolytic oxidation after filling the substrate with the nickel hydroxide.

Another method for producing a positive electrode of an alkaline storage battery of the present invention comprises the steps of:

sticking at least either one salt of a rare earth element or an alkaline earth metal element on a surface of a fiber, the fiber is made of a transition metal or a resin having a layer of the transition metal on the surface thereof; and synthesizing a compound oxide by heating the fiber.

Another method for producing a positive electrode of an alkaline storage battery of the present invention comprises the steps of:

mixing nickel hydroxide as an active material and at least one transition metal powder;

sticking at least one alkali metal salt with the nickel hydroxide; and synthesizing a compound oxide by heating the nickel hydroxide until the amount of the compound oxide be 2–30 wt % to the amount of the nickel hydroxide.

Another method for producing a positive electrode of an alkaline storage battery of the present invention comprises the steps of:

sticking at least one salt of an alkaline earth metal element on a surface of a fiber, the fiber is made of a transition metal or a resin having a layer of the transition metal on the surface thereof;

synthesizing a compound oxide by heating the fiber; and applying a mixture containing nickel hydroxide and the compound oxide by 2–30 wt % to the amount of the nickel hydroxide to a substrate for supporting the substrate.

The positive electrode in the alkaline storage battery of the present invention is composed of a conductive substrate and a mixture of nickel hydroxide acting as an active material and a compound oxide. The substrate can be made from foamed metal, punching metal, a metal sheet, or a member having a three-dimensional space such as metal fiber felt.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENTS

Figure 1:
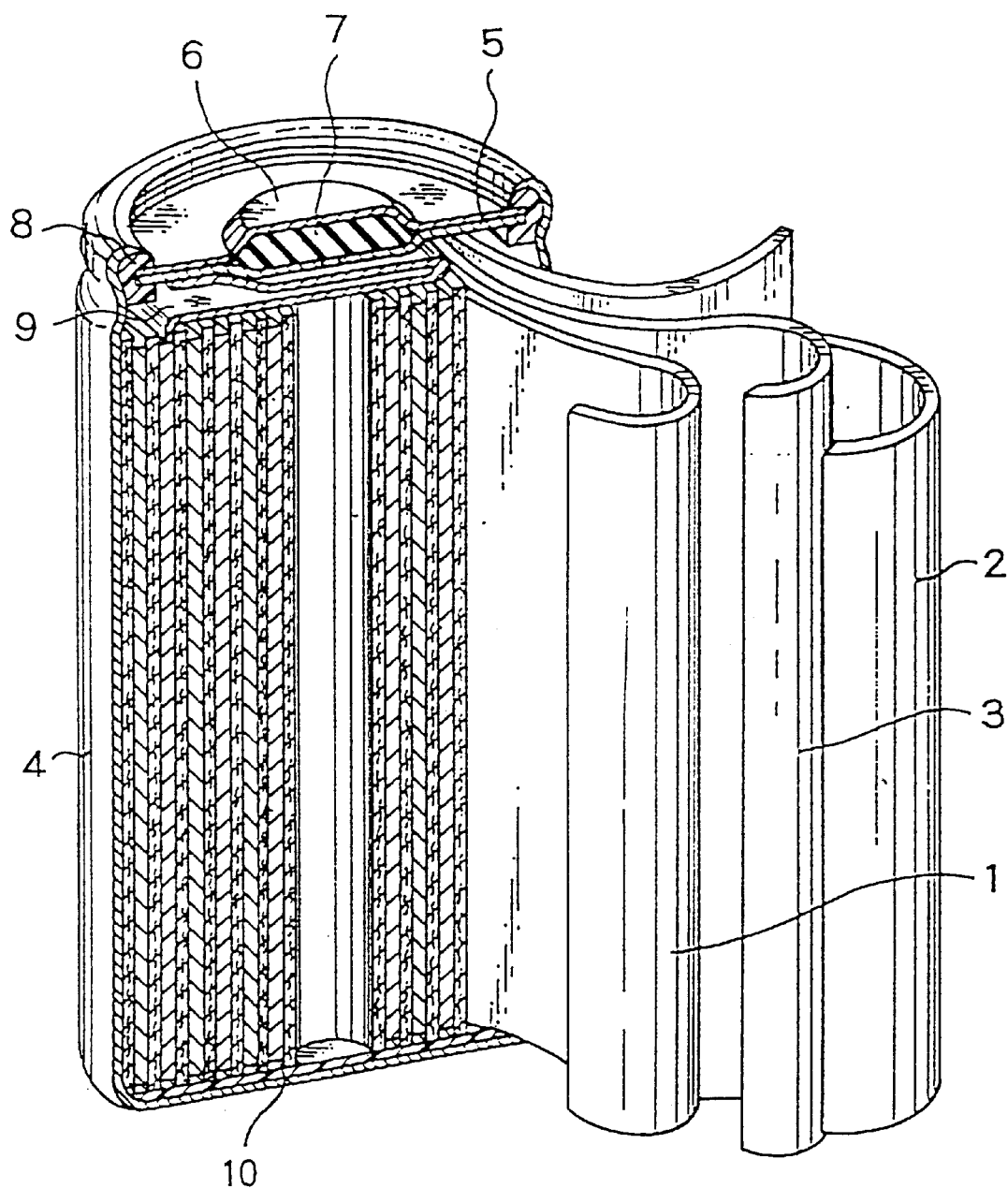
FIG. 1 is a longitudinal cross-sectional view of the cylindrical alkaline storage battery of the embodiment of the present invention.

The embodiment of the present invention will be detailed below with reference to the drawings.

EXAMPLE 1

The following is a description on a compound oxide $La_{0.7}Sr_{0.3}CoO_{3-x}$ which is one of the compound oxides used in the positive electrode of the alkaline storage battery of the present invention. The x represents a defect amount of oxygen. Generally, the amount of oxygen in compound oxide is varied depending on its composition or synthesizing conditions, so that it shows a non-integer value. The difference between the value and an integer is indicated as the amount of defective. The compound oxide $La_{0.7}Sr_{0.3}CoO_{3-x}$ was synthesized as follows.

A metal salts aqueous solution was prepared by dissolving 131.5 g of lanthanum nitrate hexa hydrate $Ln(NO_3)_3 \cdot 6H_2O$, 27.6 g of anhydrous strontium nitrate $Sr(NO_3)_2$, and 126.3 g of cobalt nitrate hexa hydrate $Co(NO_3)_2 \cdot 6H_2O$ in 2 liter of water. Furthermore, an alkaline aqueous solution was prepared by dissolving 100 g of sodium hydroxide and 100 g of sodium carbonate in 1 liter of water. While stirring the metal salts aqueous solution, drops of the alkaline aqueous solution were added until the pH of the metal salts aqueous solution was set in a range of 10 to 12 and a mixture of hydroxides and carbonates of the constituent metal elements was precipitated. Here, the carbonates were used because strontium carbonate has lower solubility than strontium hydroxide synthesized therewith.

The precipitated mixture was filtered, dried, and pulverized into powder. The obtained powder was washed in water and preliminarily sintered in the air for three hours at a temperature of 600° C. Then, the powder was washed in water again to remove sodium remained in the powder. The washing was continued until the pH of the washing water became 9 or lower, and then the powder was sintered in the air for three hours at 800° C. Then, in order to subject the sintered powder to a full oxidation reaction, a process of pulverizing, mixing and sintering the sintered powder in the air for three hours at 800° C. was repeated two times. As the result, 100 g of the compound oxide $La_{0.7}Sr_{0.3}CoO_{3-x}$ was synthesized. This synthesizing method is hereinafter referred to as the "solution synthesizing method".

The compound oxide powder thus synthesized was mixed with a methyl cellulose powder by 1 wt % to the amount of the compound oxide powder, and pressed with a pressure of 2 t/cm² to form it into a disk shape pellet having a thickness of 5 mm and a diameter of 25 mm, using a metal mold. The pellet was cut and formed into a square prism with a length of about 20 mm and a cross section of 5 mm×5 mm, and was used as a test piece. The electric conductivity of the test piece was measured at 25° C. by AC four-terminal method, and turned out to be about 10 S/cm. In addition, this compound oxide was hardly dissolved in a 31 wt % KOH aqueous solution.

Although the average diameter of the primary particles of the compound oxide had been 1 pm or smaller (in a specific surface area of 10 to 20 m²/g), these primary particles were aggregated each other to form into secondary particles whose average diameter was 10 to 20 pm. These secondary particles were put in water and dispersed in a dispersion device with a high-rate dispersion blade until the average diameter of the particles became about 2 µm.

Another compound oxide which has the same composition as the aforementioned compound oxide was synthesized as follows. Firstly, predetermined amounts of a lanthanum oxide powder, a strontium carbonate powder, and a tricobalt tetroxide powder were stirred and mixed. The mixture was kneaded with some water, dried, pulverized, and sintered in the air for three hours at 1,100° C. The purpose of adding some water to the mixture is to fully mix the whole contents by dissolving water-soluble materials in the water. The sintering was executed at 1,100° C. because the compound reaction is hard to take place at a lower temperature. Then, in order to subject the sintered powder to a full oxidation reaction, a process of pulverizing, mixing and sintering the sintered powder in the air for three hours at 1,100° C. was repeated two times. As the result, the compound oxide $La_{0.7}Sr_{0.3}CoO_{3-x}$ was synthesized. This synthesizing method is hereinafter referred to as the powder synthesizing method. The average diameter of the primary particles of the compound oxide powder thus synthesized was in a range of 2 to 5 µm. In order to obtain particles having larger diameters, the compound oxide was mixed with a 1 wt % methyl cellulose powder and pressed with a pressure of 2 t/cm², by using a cylindrical metal mold having a diameter of 2.5 cm, so as to form it into a pellet. The pellet was sintered in the air for twenty four hours at 1,200° C., then pulverized, and classified. [0015]

A positive electrode was manufactured as follows by using the compound oxide powder, $La_{0.7}Sr_{0.3}CoO_{3-x}$, and an alkaline storage battery was manufactured by using the positive electrode.

A predetermined amount of the compound oxide powder, $La_{0.7}Sr_{0.3}CoO_{3-x}$ which had been synthesized by the solution synthesizing method was added to nickel hydroxide powder containing cobalt and zinc in a state of solid-solution (hereinafter referred to merely as nickel hydroxide powder), and fully stirred to mix. Then, this mixture was further mixed with a 1 wt % zinc oxide (ZnO) powder and some water to obtain a paste. The paste was applied to a foamed nickel sheet which had an average pore size of 150 μm, a porosity of 95%, and a thickness of 1.0 mm. Then, the foamed nickel sheet with the paste was dried at 90° C., pressed with a roller press to be 0.7 to 0.8 mm thick, and coated with a fluorocarbon resin powder. Here, zinc oxide works to prevent the positive electrode from swelling during a charge/discharge process, thereby improving the cycle life characteristic of the alkaline storage battery. The foamed nickel sheet was cut into a size of a width of 3.5 cm and a length of 11 cm, and a lead was attached to a predetermined position. As the result a positive electrode with a capacity of about 1,500 mAh was obtained.

A negative electrode was manufactured as follows by using hydrogen storage alloy powder represented by the general formula of $MmNi_{3.55}Co_{0.75}Mn_{0.4}Al_{0.3}$. Mm is a misch metal synthesized of La, Ce, and the like. Firstly, the hydrogen storage alloy powder having a particle diameter of 53 pm or smaller was soaked in a 31 wt % KOH alkaline aqueous solution of 80° C. for one hour so as to remove alkali-soluble elements in the alloy powder, and activate the alloy powder surface. Then, the activation-processed alloy powder was mixed with a diluted carboxymethyl cellulose aqueous solution to form a paste. The paste was applied to a foamed nickel sheet which had an average pore size of 150 pm, a porosity of 95%, and a thickness of 1.0 mm. Then, the foamed nickel sheet with the paste was dried at 90° C., pressed with a roller press to be 0.4 mm thick, and coated with a fluorocarbon resin powder. The foamed nickel sheet was cut into a size of a width of 3.5 cm and a length of 14.5 cm. As a result, a negative electrode was obtained.

By using the positive electrode 1 and the negative electrode 2, the alkaline storage battery shown in FIG. 1 was assembled as follows. The positive electrode 1 and the negative electrode 2 were stacked with a separator 3 disposed therebetween. The separator 3 was made from an unwoven fabric of polypropylene fiber whose surface had been subjected to a hydrophilic treatment. This stack was coiled up and put into a 4/5 A sized battery case 4 made of nickel plated steel. Then, the battery case 4 was filled with 2.35 ml of an alkaline electrolyte which was synthesized of a potassium hydroxide aqueous solution having a specific gravity of 1.3 and 30 g/l lithium hydroxide dissolved therein. Finally, the battery case 4 was sealed with a sealing plate 5. The positive terminal cap 6 was welded to the sealing plate 5, and a gasket 8 was provided around the sealing plate 5. A safety valve 7 is disposed between the sealing plate 5 and the positive terminal cap 6 in a state of being compressed. The bottom surface of the sealing plate 5 is electrically connected with the positive electrode 1 via a connector 9. The negative electrode 2 is electrically connected with the bottom surface of the battery case 4 via another connector 10.

The alkaline storage battery thus assembled was charged to 150% of the capacity at 0.1 C (10-hour rate, that is, for example, in a battery with 1,500 mAh, the electric current is 150 mA) at 20° C. and then discharged at 0.2 C until the battery voltage dropped to 1.0 V. After the completion of the discharge process, the battery was left for five days at 45° C, and then subjected to a forming process. The forming process was performed by repeating to charge the battery to 120% of the capacity at 0.2 C at 45° C. and then to discharge it at 0.2 C until the battery voltage dropped to 1.0 V for 10 to 20 cycles. This battery is referred to as a test battery.

The test battery was used to examine the relation between the amount of the compound oxide powder $La_{0.7}Sr_{0.3}CoO_{3-x}$ added to the positive electrode and the utilization rate of the positive electrode active material during a charge/discharge process at 1 C at 20° C. The compound oxide powder used here had been synthesized by the solution synthesizing method and then subjected to the high-rate dispersion process. Test batteries which employed positive electrodes containing compound oxide powder $La_{0.7}Sr_{0.3}CoO_{3-x}$ in a range of 0 to 30 wt % were manufactured and subjected to the following tests.

(1) A charge/discharge test at 1 C (corresponding to 1.5 A) at 20° C.

Figure 2:
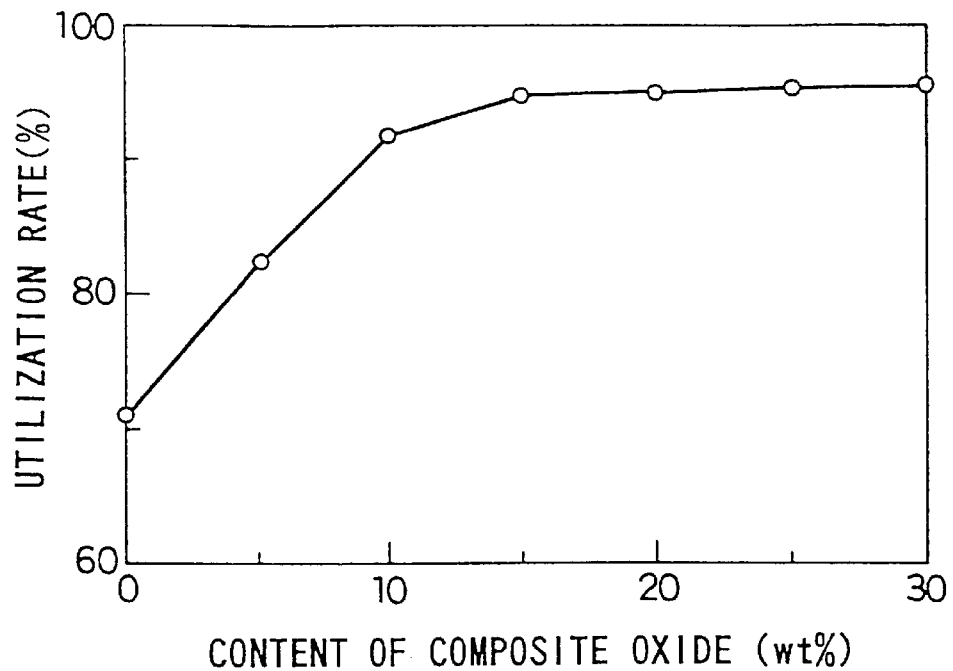
FIG. 2 is a graph showing the relation between the amount of compound oxide added and the utilization rate of the positive electrode active material in the alkaline storage battery during a discharge process of 1 C at 20° C.

The test batteries were discharged at 0.2 C (0.3 A) to a cut-off voltage of 1.0 V at 20° C., and charged at 1 C to 120% of the capacity, that is, for 1.2 hours. After having been left for one hour, the batteries were discharged at 1 C until the voltage decreased to 1.0 V, and the discharge capacity was measured. The results are shown in FIG. 2. The utilization rate of the positive electrode active material in a test battery that employed a positive electrode containing no compound oxide was about 70%. The utilization rate became higher as more amount of compound oxide was added to the positive electrode and reached it peak when the amount added was 15 wt %. When more amount of compound oxide was added, the utilization rate did not grow higher than 95%. In a case of a high-rate discharge process, which is not shown, the utilization rate continued to grow until the amount of compound oxide added reached 30 wt %. Thus, the more amount of compound oxide is added, the higher the utilization rate of the positive electrode active material becomes. However, the theoretical capacity of a battery is determined by the amount of nickel hydroxide acting as a positive electrode active material. When the amount of the compound oxide added is increased, the amount of nickel hydroxide is reduced, which leads to a drop in the battery capacity. Therefore, it is necessary to minimize the amount of the compound oxide added in order to secure the amount of the positive electrode active material. Taking the discharge capacity during a high-rate discharge process into consideration, the preferable amount of the compound oxide to be added is in a range of 2 to 30 wt % of nickel hydroxide, and further preferably in a range of 5 to 15 wt %.

Another test was conducted to examine the influence of the average particle diameter of the compound oxide powder, $La_{0.7}Sr_{0.3}CoO_{3-x}$ on the utilization rate of the positive electrode active material during the charge/discharge process at 1 C at 20° C. Five positive electrodes containing the following different powders A-D by 10 wt % to the amount of the hydroxide powder were manufactured and test batteries employing these positive electrodes were evaluated.

Figure 3:
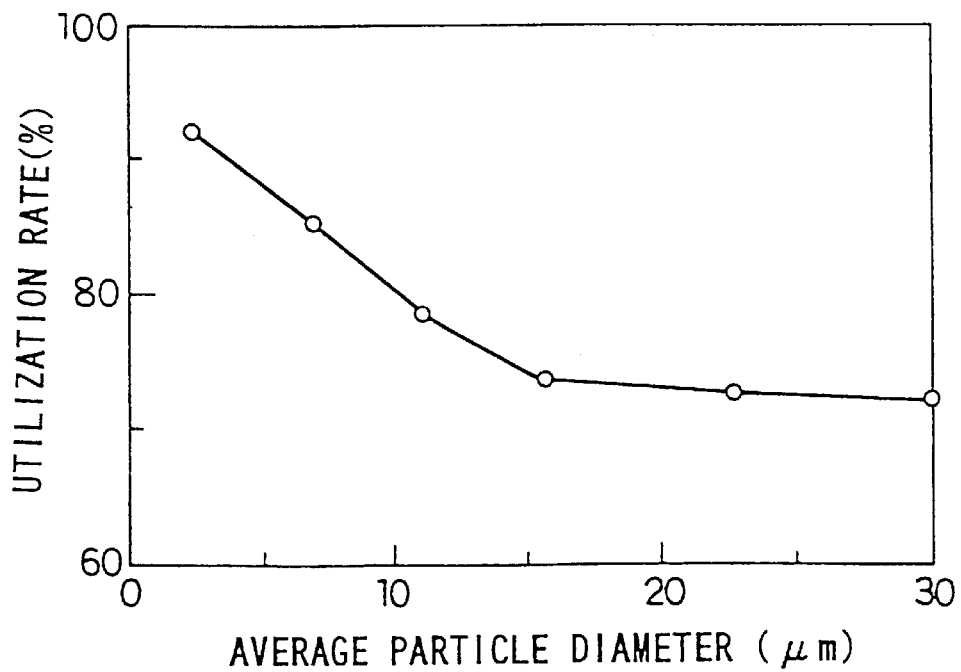
FIG. 3 is a graph showing the relation between the average particle diameter of compound oxide and the utilization rate of the positive electrode active material in the alkaline storage battery during a discharge process of 1 C at 20° C.

A) a compound oxide powder $La_{0.7}Sr_{0.3}CoO_{3-x}$ with average particle diameter of about 2 μm which has been synthesized by the solution synthesizing method and subjected to the high-rate dispersion process B) the same compound oxide powder which has been synthesized by the powder synthesizing method C) a mixture of the same compound oxide powder which has been synthesized by the solution synthesizing method and not subjected to the high-rate dispersion process, and the same compound oxide powder which has been synthesized by the powder synthesizing method D) a compound oxide powder which has been synthesized by the powder synthesizing method and classified The results of the evaluation are shown in FIG. 3. As the average particle diameter of the compound oxide powder becomes larger, the utilization rate of the positive electrode active material decreases. This utilization rate is as high as 90 wt % when the average particle diameter is about 5 pm or smaller. However, it falls to 80 wt % when the average particle diameter is 10 pm or larger. Consequently, it has been revealed that the compound oxide powder with smaller particles can effectively increase the conductivity among the nickel hydroxide particles. The preferable average particle diameter of the compound oxide is 5 $\mu$m or smaller.

The test battery which employed the positive electrode containing the compound oxide powder D of 10 wt % of nickel hydroxide was subjected to a deep discharge test and a charge/discharge cycle life test under the following conditions.

(2) a deep discharge test

The test battery was discharged at 0.2 C at 20° C. until the battery voltage decreased to 1.0 V, and then preserved for two months at 45° C. with a 1 kΩ external load connected to the electrodes. The discharge capacity in the charge/discharge test at 1 C at 20° C. was measured before and after the preservation.

(3) a charge/discharge cycle life test The test battery was charged at 1 C to 120% of the capacity at 45° C. and then discharged at 1 C until the battery voltage decreased to 1.0 V. This charge/discharge cycle was repeated, and a decrease in the discharge capacity during the repeated cycles was measured.

Figure 4:
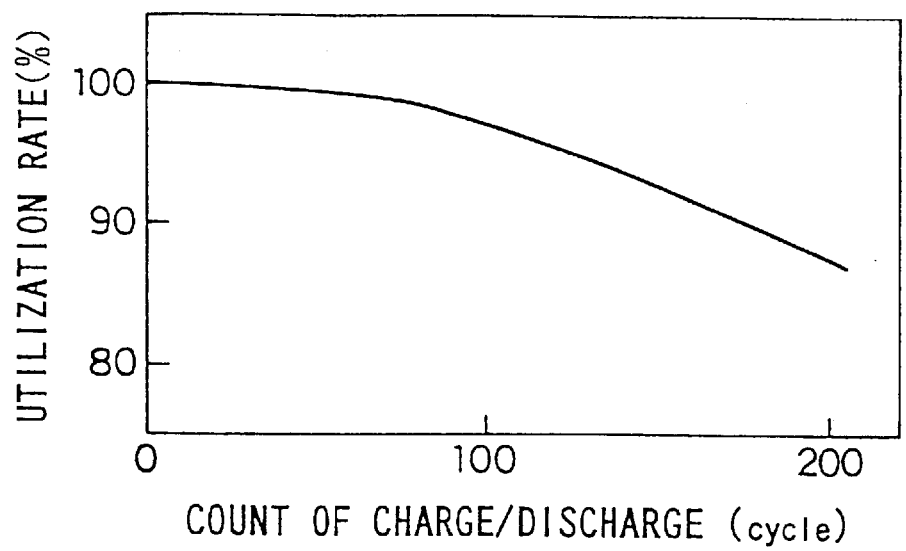
FIG. 4 is a graph showing the relation between the charge/discharge cycles with 1 C at 45° C. and the capacity preservation rate of the alkaline storage battery.
Figure 5:
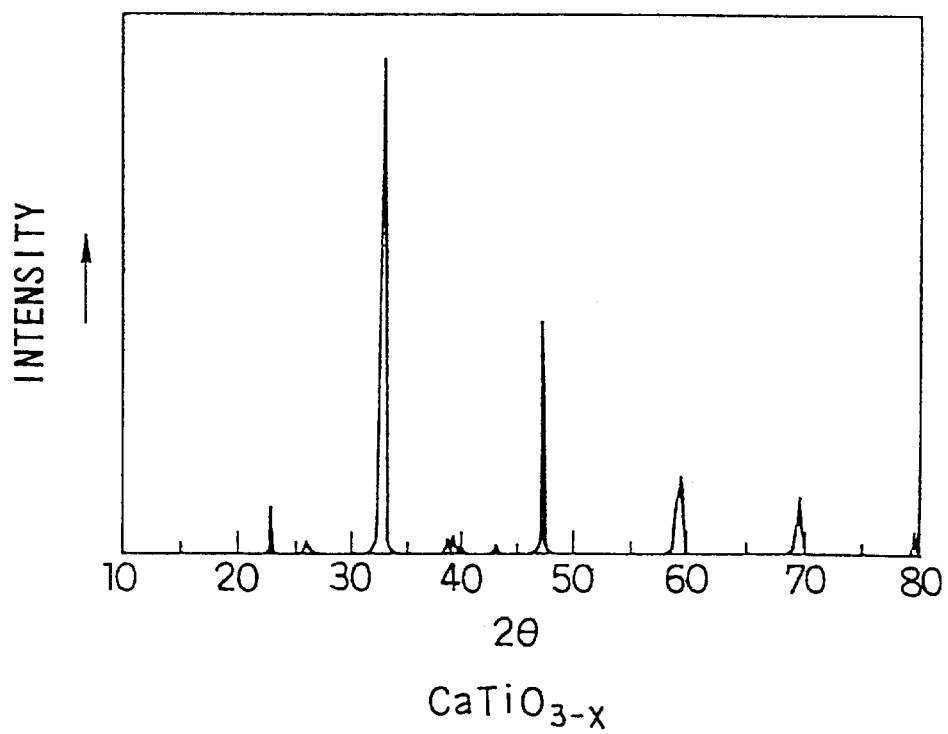
FIG. 5 shows an X ray diffraction pattern of a compound oxide $CaTiO_{3-x}$, which has a perovskite crystal structure.
Figure 6:
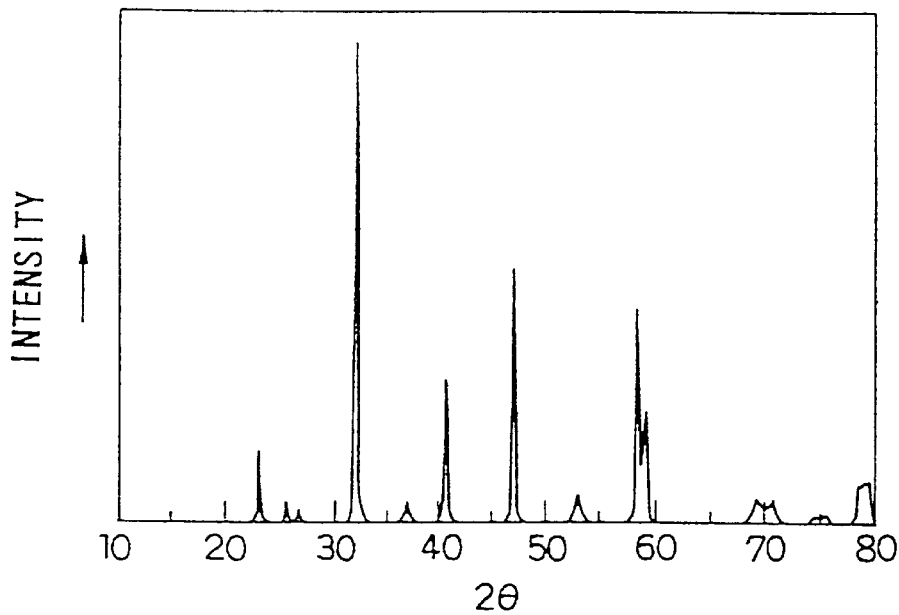
FIG. 6 shows an X ray diffraction pattern of a compound oxide $La_ySr^{1-y}CoO_{3-x}$ (y≈0.5) which has the perovskite crystal structure.
Figure 7:
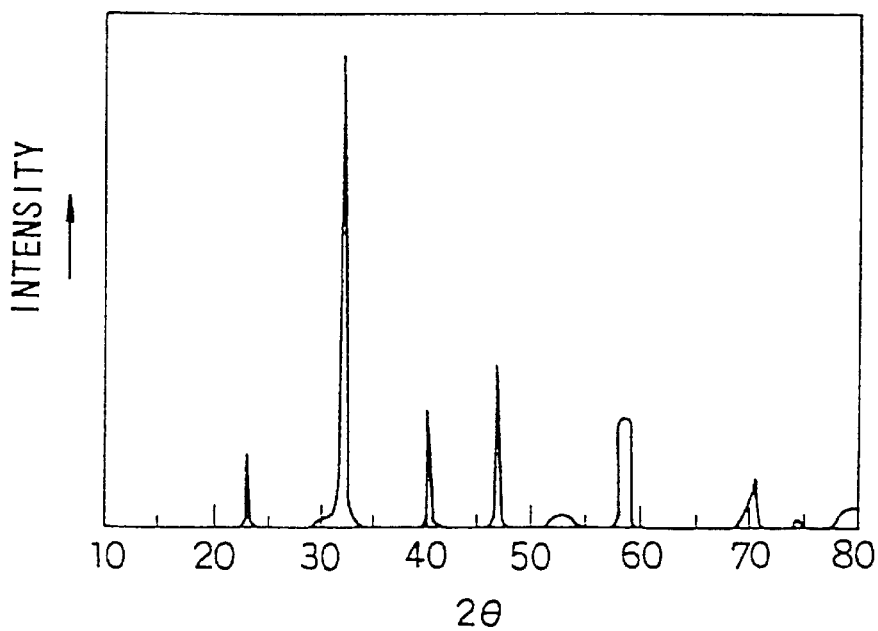
FIG. 7 shows an X ray diffraction pattern of a compound oxide $La_yCa_{1-y}MnO_{3-x}$ (y≈0.8) which has the perovskite crystal stricture.
Figure 8:
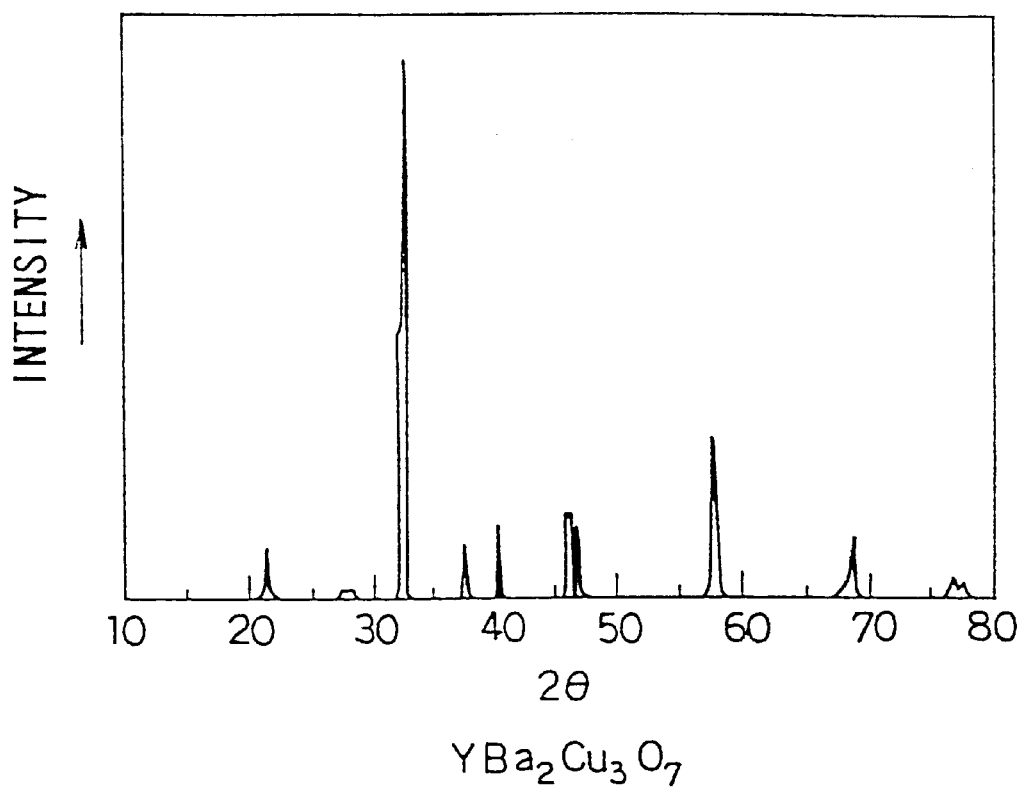
FIG. 8 shows an X ray diffraction pattern of a compound oxide $YBa_2Cu_3O_7$ which has the perovskite crystal structure.

In the deep discharge test, the capacity restoration rate of the test battery was as high as 92%. In the charge/discharge cycle life test, the capacity preservation rate was about 85 wt % as shown in FIG. 4 even after 200 cycles passed. These results indicate excellent cycle characteristic of the test battery.

EXAMPLE 2

Test batteries were manufactured by using different compound oxides which had been synthesized as follows, and these test batteries were evaluated in the same manner as in EXAMPLE 1. The compositions of the compound oxides were adjusted to the amount of the materials.

(a) a composition of an compound oxide $La_{0.8}Ca_{0.2}CoO_{3-x}$.

An aqueous solution was prepared by dissolving predetermined amounts of lanthanum nitrate, calcium nitrate, and manganese nitrate in 2 liter of water. While stirring this aqueous solution, drops of another aqueous solution which contained 1 liter of water and 100 g of sodium hydroxide and 100 g of sodium carbonate dissolved in the water were added. As a result, a mixture of the constituent metal element hydroxide and carbonate was precipitated. The precipitated mixture was filtered, dried, pulverized, washed in water, and sintered in the air for three hours at 600° C. Then, the sintered mixture was washed in water again to remove sodium remained in the mixture. The washing was continued until the pH of the washing water became 9 or lower, and then the mixture was sintered in the air for three hours at 900° C. Then, in order to subject the sintered mixture to a full oxidation reaction, a process of pulverizing, mixing and sintering the mixture in the air for three hours at 900° C. was repeated two times. As the result, the compound oxide $La_{0.7}Sr_{0.3}CoO_{3-x}$ was synthesized.

(b) a composition of a compound oxide $La_{0.7}Sr_{0.3}CoO_{3-x}$

An aqueous solution was prepared by dissolving predetermined amounts of lanthanum nitrate, cerium nitrate, and chrome nitrate in 2 liter of water. While stirring this aqueous solution, drops of another aqueous solution which contained 1 liter of water and 100 g of sodium hydroxide dissolved therein were added. As a result, a mixture of the constituent metal element hydroxides was precipitated. The precipitated mixture was filtered, dried, pulverized, washed in water, and sintered in the air for three hours at 600° C. Then, the mixture was washed in water again to remove sodium remained in the mixture, and sintered in the air for three hours at 800° C. Then, a process of pulverizing, mixing, and sintering the mixture in the air for three hours at 800° C. was repeated two times. As the result, the compound oxide $La_{0.8}Ce_{0.2}CoO_{3-x}$ was synthesized.

(c) a composition of a compound oxide $La_{0.90.1}CoO_{3-x}$

A metal salts aqueous solution was prepared by dissolving predetermined amounts of lanthanum nitrate, cerium nitrate, and nickel nitrate in 2 liter of water. While stirring this metal salts aqueous solution, drops of another aqueous solution which contained 1 liter of water and 100 g of sodium hydroxide dissolved therein were added. As a result, a mixture of the constituent metal element hydroxides was precipitated. The precipitated mixture was filtered, dried, pulverized, washed in water, and sintered in the air for three hours at 600° C. Then, the mixture was washed in the water again to remove sodium remained in the mixture, and sintered in the air for three hours at 900° C. Then, a process of pulverizing, mixing and sintering the mixture in the air for three hours at 900° C. was repeated two times. As the result, the compound oxide $La_{0.9}Ce_{0.1}CoO_{3-x}$ was synthesized.

(d) a composition of a compound oxide $Nd_{0.8}Sr_{0.2}FeO_{3-x}$

A metal salts aqueous solution was prepared by dissolving predetermined amounts of neodymium nitrate, strontium nitrate, and iron nitrate in 2 liter of water. While stirring this metal salts aqueous solution, drops of another aqueous solution containing 100 g of sodium hydroxide and 100 g of sodium carbonate dissolved in 1 liter of water were added. As a result, a mixture of the constituent metal element hydroxides and carbonates was precipitated. The precipitated mixture was filtered, dried, pulverized, washed in water, and sintered in the air for three hours at 600° C. Then, the mixture was washed in water again to remove sodium remained in the mixture, and sintered in the air for three hours at 900° C. Then, a process of pulverizing, mixing and sintering the mixture in the air for three hours at 900° C. was repeated two times. As the result, the compound oxide $Nd_{0.8}Sr_{0.2}FeO_{3-x}$ was synthesized.

(e) the composition of compound oxide $Li_{0.8}CoO_{2-x}$

Predetermined amounts of a $Li_2CO_3$ powder and a $Co_3O_4$ powder were mixed with some water. The mixture was pulverized, mixed and sintered in the air for three hours at 900° C. In order to subject the sintered mixture to a full oxidation reaction, a process of pulverizing, mixing and sintering the sintered mixture in the air for three hours at 900° C. was repeated three times. As the result, the compound oxide $Li_{0.8}CoO_{2-x}$ was synthesized.

(f) a composition of a compound oxide $Li_{0.75}TiO_{2-x}$

Predetermined amounts of an $Li_2CO_3$ powder and a $TiO_2$ powder were mixed with some water. The mixture was pulverized and sintered in the air for three hours at 1,000° C. In order to subject the sintered mixture to a full oxidation reaction, a process of pulverizing, mixing and sintering the sintered mixture in the air for three hours at 1,000° C. was repeated three times. As the result, the compound oxide $Li_{0.75}TiO_{2-x}$ was synthesized.

(g) a composition of a compound oxide $YBa_2Cu_3O_{7-x}$

A metal salts aqueous solution was prepared by dissolving predetermined amounts of yttrium nitrate, barium nitrate, and copper nitrate in 2 liter of water. While stirring this metal salts aqueous solution, drops of another aqueous solution which contained 1 liter of water and 200 g of guanidine carbonate dissolved therein were added. As a result, a mixture of the constituent metal element hydroxides and carbonates was precipitated. The precipitated mixture was filtered, dried, pulverized, and sintered in the air for three hours at 900° C. Then, the mixture was pulverized, mixed and sintered in the air for three hours at 900° C. As a result, the compound oxide $YBa_2Cu_3O_{7-x}$ was synthesized.

These compound oxides were all insoluble in a 31 wt % KOH aqueous solution at 20° C. The electric conductivity of these compound oxides were measured in the same manner as in EXAMPLE 1. After subjecting these compound oxides to the high-rate dispersion process, each positive electrode which contained one of these compound oxides by 10 wt % to the amount of the nickel hydroxide was manufactured. Then, test batteries employing these positive electrodes respectively were manufactured and subjected to the electric conductivity measurement, the 1 C charge/discharge test (1), the deep discharge test (2), and high-temperature charge/discharge cycle life test (3) in the same manner as in EXAMPLE 1. The results of these tests are shown in TABLE 1.

TABLE 1

| Composite Oxide | electric conductivity [S/cm] | utilization rate [%] | restration rate [%] | preservation rate [%] |
|---|---|---|---|---|
| $La_{0.8}Ca_{0.2}MnO_{3-x}$ | 1 | 90 | 95 | 87 |
| $La_{0.8}Ce_{0.2}CrO_{3-x}$ | 1 | 93 | 98 | 89 |
| $La_{0.9}Ce_{0.1}NiO_{3-x}$ | 1 | 93 | 95 | 86 |
| $Nd_{0.8}Sr_{0.2}FeO_{3-x}$ | 1 | 88 | 96 | 80 |
| $La_{0.6}Sr_{0.4}Mn_{0.4}Fe_{0.6}O_{3-x}$ | 1 | 91 | 95 | 84 |
| $La_{0.8}Ce_{0.2}Co_{0.3}Fe_{0.7}O_{3-x}$ | 10 | 92 | 95 | 85 |
| $Nd_{0.7}Ce_{0.3}Co_{0.8}Ni_{0.2}O_{3-x}$ | 10 | 93 | 97 | 86 |
| $Li_{0.8}CoO_{2-x}$ | 1 | 94 | 98 | 88 |
| $Li_{0.75}TiO_{2-x}$ | $10^{-2}$ | 90 | 96 | 84 |
| $Li_{0.8}Co_{0.9}Mn_{0.1}O_{2-x}$ | $10^{-1}$ | 92 | 95 | 85 |
| $YBa_2Cu_3O_{7-x}$ | 20 | 94 | 96 | 88 |

All the test batteries that employed any of these compound oxides demonstrated excellent characteristics both in the deep discharge test and the high-temperature charge/discharge cycle life test.

In addition, another compound oxide which had been synthesized by the solution synthesizing method by using two or more transition metal elements showed excellent characteristics as well.

In place of sodium hydroxide as an alkali hydroxide in the present embodiment, organic bases such as potassium hydroxide, lithium hydroxide, ethlamine, butylamine, or guanidine can be used to obtain the same effect. Furthermore, an alkali carbonate or an alkali bromide can be used as well.

EXAMPLE 3

A compound oxide $La_{0.7}Sr_{0.3}Co_{0.6}Fe_{0.4}O_{3-x}$ was synthesized by the solution synthesizing method used in EXAMPLE 1. The compound oxide was subjected to the high-rate dispersion process and dried under a diminished pressure at low temperatures. Then, the dried compound oxide was put into an acrylic resin prepolymer aqueous solution and mixed well, thereby forming it into a paste having a high viscosity. The paste was pressed out a die through a number of nozzles having a diameter of 0.2 mm formed thereon, so as to shape the paste into a fiber and then heated to harden the prepolymer.

The compound oxide-contained fiber was sintered for four hours under an atmosphere diminished pressure at 1,000° C. in order to remove an acrylic resin contained in the fiber, cooled, and again sintered in the air for six hours at 1,100° C. As the result, a fibrous compound oxide $La_{0.7}Sr_{0.3}Co_{0.6}Fe_{0.4}O_{3-x}$ having a diameter of 6 to 10 μm and a length of 0.1 to 0.3 mm was obtained.

A positive electrode containing the fibrous compound oxide by 10 wt % to the amount of nickel hydroxide was manufactured in the same manner as EXAMPLE 1, and a test battery employing this positive electrode was manufactured and evaluated. The positive electrode further contained cobalt oxide (CoO) by 5 wt % and zinc oxide (ZnO) by 1 wt % to the amount of nickel hydroxide. In place of cobalt oxide, which is used in the present embodiment, metallic cobalt or cobalt hydroxide can be used to obtain the same effects. The purpose of adding the metallic cobalt or the cobalt compounds is storing a discharge reserve (a discharge compensation capacity) in the negative electrode rather than improving the electric conductivity among nickel hydroxide particles. This can improve the low-temperature discharge characteristic of the test battery by a fewer number of a charge/discharge formation process.

The utilization rate of the positive electrode active material of this test battery in the 1 C charge/discharge test at 20° C. was 95%, and the capacity restoration rate in the deep discharge test was 96%. The test battery showed a capacity preservation rate of over 90 wt % in the 1 C charge/discharge cycle life test at 45° C. even after 200 cycles passed. Thus, it has been revealed that a positive electrode containing the fibrous compound oxide has excellent characteristics in the capacity restoration rate after the deep discharge and the high-temperature charge/discharge cycle life.

In this example, a fibrous compound oxide was prepared by dispersing a compound oxide in a prepolymer, forming the dispersion into fiber, and sintering the fiber. The same fibrous compound oxide can be prepared by spreading compound oxide powder over the surface of resin fiber and sintering it to remove the resin fiber. Furthermore, it can also be prepared by separately spreading metal oxide over the fiber and sintering it.

EXAMPLE 4

Another compound oxide was prepared by the hydrothermal synthesis method as follows.

A powder obtained by oxidizing cobalt hydroxide in the air at 120° C., predetermined amounts of a strontium hydroxide powder and a lanthanum oxide powder were mixed with a 20 wt % sodium hydroxide aqueous solution. After having stirred well, the mixture was heat-treated for 60 hours at 500° C. in a sealed vessel with heat- and pressure-resistance. As the result, a compound oxide $La_{0.7}Sr_{0.3}Co_{0.3}O_{3-x}$ having a specific surface area as large as 30 to 50 m²/g was synthesized.

This compound oxide was also insoluble in a 31 wt % KOH aqueous solution of 20° C. The electric conductivity of the compound oxide was measured in the same manner as in EXAMPLE 1 and turned out to be as high as 10 S/cm. After subjecting the compound oxide to the high-rate dispersion process, a positive electrode containing this compound oxide by 10 wt % to the amount of the nickel hydroxide was manufactured. Then, a test battery employing this positive electrode was manufactured and evaluated in the same manner as in EXAMPLE 1. The utilization rate of the positive electrode active material of this test battery in the 1 C charge/discharge test at 20° C. was about 93%, and the capacity restoration rate in the deep discharge test was 95%. The test battery showed a capacity preservation rate of over 90% in the charge/discharge cycle life test at 45° C. even after 200 cycles passed.

In the present example, the compound oxide was mixed with nickel hydroxide after having been synthesized. However, the same effects can be obtained by putting nickel hydroxide powder in a reaction vessel together with the materials of the compound oxide and then subjecting to the hydrothermal reaction. The reason for this is that since transition metal elements other than nickel are more stable than nickel in a high-order (greater than trivalence) oxidation state, the oxidation of the materials and the synthesization of the compound oxide are taken place preferentially.

Another method for composing compound oxide is to form a transition metal oxide layer over the surface of a nickel hydroxide powder and then to convert it to compound oxide in the following manner.

A nickel hydroxide powder was mixed with cobalt oxyhydroxide which had been obtained by oxidizing cobalt hydroxide in the air at 120° C. As the result, a cobalt oxyhydroxide layer was formed over the surface of the nickel hydroxide powder. This powder was put into a 30 wt % NaOH aqueous solution and stirred to be mixed. The mixture was heat-treated for 60 hours at 300° C. in a sealed vessel with heat- and pressure-resistance. As the result, a layer of compound oxide $Na_xCoO_2$ (x<1) was formed over the surface of the nickel hydroxide.

A positive electrode containing the nickel hydroxide thus obtained was manufactured, and a test battery employing this positive electrode was assembled and evaluated in the same manner as in EXAMPLE 1. The utilization rate of the positive electrode active material of this test battery in the 1 C charge/discharge test at 20° C. was about 92%, and the capacity restoration rate after the deep discharge was 97%. The test battery showed a capacity preservation rate of over 90% in the charge/discharge cycle life test at 45° C. even after 200 cycles passed.

EXAMPLE 5

A nickel hydroxide powder was mixed with chromium oxide $Cr_2O_3$ by 10 wt % to the amount of the nickel hydroxide, and as a result, a chromium oxide layer was formed over the surface of the nickel hydroxide powder. A positive electrode in which the nickel hydroxide powder had been applied to a foamed nickel sheet in the same manner as in EXAMPLE 1 was manufactured.

Then, the positive electrode was soaked in a 30 wt % nitrate aqueous solution which contained lanthanum and strontium in a ratio of 9:1. This nitrate aqueous solution also contained as much amount of a lanthanum oxide powder and a strontium carbonate powder in a ratio of 9:1 as remained undissolved in the solution. The purpose of adding these powders is to prevent the positive electrode from being corroded by nitrate ions which remained in the solution after the precipitation of lanthanum and strontium.

Then, the positive electrode was subjected to electrolytic oxidation by sending electric current, using a metallic nickel plate as the counter electrode. As a result, compound oxide $La_{1-a}Sr_aCrO_{3-x}$ was precipitated on the surface of nickel hydroxide.

A test battery employing this positive electrode was assembled and evaluated in the same manner as EXAMPLE 1. The utilization rate of the positive electrode active material of this test battery in the 1 C charge/discharge test at 20° C. was about 91%, and the capacity restoration rate after the deep discharge was 96%. The test battery showed a capacity preservation rate of 87% in the charge/discharge cycle life test at 45° C. even after 200 cycles passed.

EXAMPLE 6

Metallic nickel fiber having an average length of about 5 $\mu$m was soaked in a 1 mol/liter lanthanum nitrate aqueous solution, and heat-treated in the air for 15 minutes at 60° C. After having repeated this process two more times, it was sintered in the air for 30 minutes at 800° C. As the result, $LaNiO_{3-x}$ was formed over the surface of the metallic nickel fiber.

The same nickel hydroxide powder that was used in EXAMPLE 1 was mixed with the metallic nickel fiber of 10 wt % to the amount of the nickel hydroxide, and a positive electrode containing this mixture was manufactured. A test battery employing this positive electrode was assembled and evaluated in the same manner as in EXAMPLE 1. In addition to the compound oxide, $Co(OH)_2$ of 5 wt % and ZnO by 2 wt % were added to the positive electrode.

The utilization rate of the positive electrode active material of this test battery in the 1 C charge/discharge test at 20° C. was 93%, and the capacity restoration rate after the deep discharge was 96%. The battery showed a capacity preservation rate of over 90% in the 1 C charge/discharge cycle life test at 45° C. even after 200 cycles passed. Thus, it has been revealed that a positive electrode containing the compound oxide formed over the surface of the metal fiber can also have excellent characteristics. The fibrous compound oxide can also be obtained by plating or coating a resinous fiber with a transition metal or the like, and executing the same process as for the metal fiber. In this case, the same effects as the metal fiber used in the present example can be obtained.

Hereafter, the compound oxides used in the present invention is explained in view of crystal structure. All the specific compound oxides explained in the above examples oxides containing a transition metal element and a rare earth elements or additionally contains alkaline earth metal elements have perovskite crystal structure. Compound oxides which contain at least one transition metal element and at least either one element of rare earth elements and alkaline earth metal elements also have the perovskite crystal structure, and the same effect is obtained by using these compound oxides. The transition metal elements include Ti, Cr, Mn, Fe, Co, Ni, and Cu, the rare earth elements include La, Ce, Nd, Pr, and Y, and the alkaline earth metal elements include Mg, Sr, Ca, and Ba.

X ray diffraction patterns of compound oxides as concrete examples which can be used in the positive electrode of the alkaline storage battery in accordance with the present invention are shown in FIGS. 5–10. These diffraction patterns are caused by their perovskite-type crystal structures.

Figure 9A:
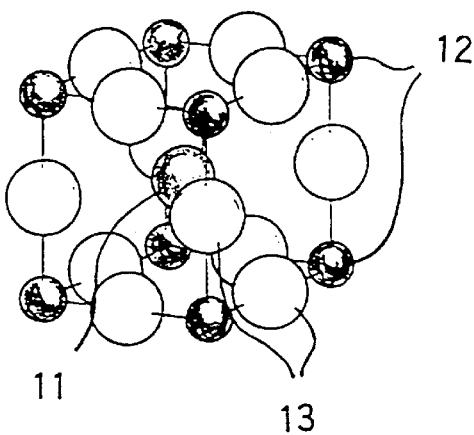
FIG. 9a shows a model which has an A-type perovskite crystal structure.
Figure 9B:
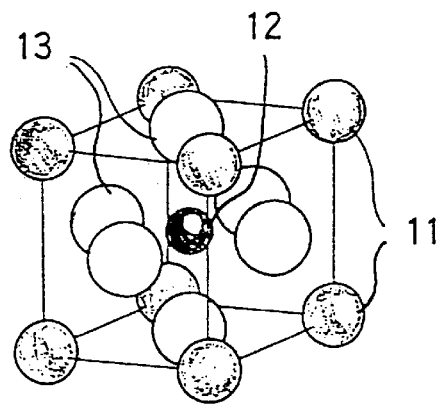
FIG. 9b shows a model which has a B-type perovskite crystal structure.
Figure 9C:
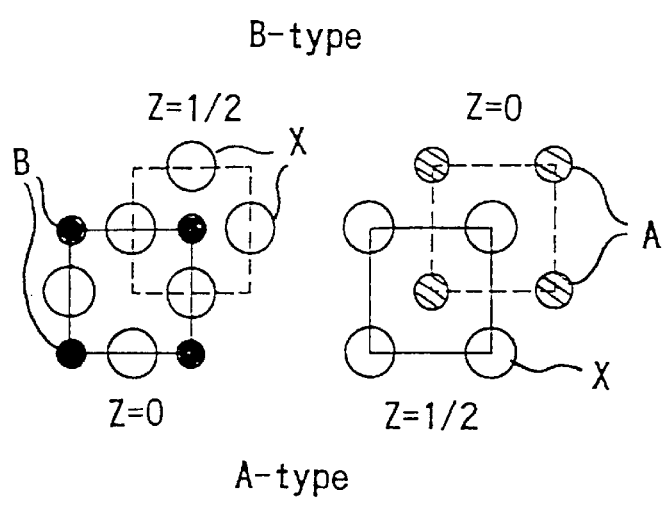
FIG. 9c shows a relation of the A-type and the B-type.

Here, some explanation about perovskite crystal structure is mentioned. An identically perovskite crystal structure, there are A-type unit cell as is shown in FIG. 9a and B-type unit cell as is shown in FIG. 9b. In the A-type unit cell, an atom A occupies body center of the unit cell, an atom B occupies corner of the unit cell and atom X occupies center of an edge of the unit cell. On the other hand, in the B-type unit cell, an atom A occupies corner of the unit cell, an atom B occupies body center of the unit cell and an atom X occupies face center of the unit cell. A structure of layers in the perovskite type crystal is as shown in FIG. 9c. This shows a relation between the A-type and the B-type. However, in a practical compound oxide, as well known in the art, crystal structure is defective from the complete perovskite type crystal structure to some extent because of strains.

Figure 10:
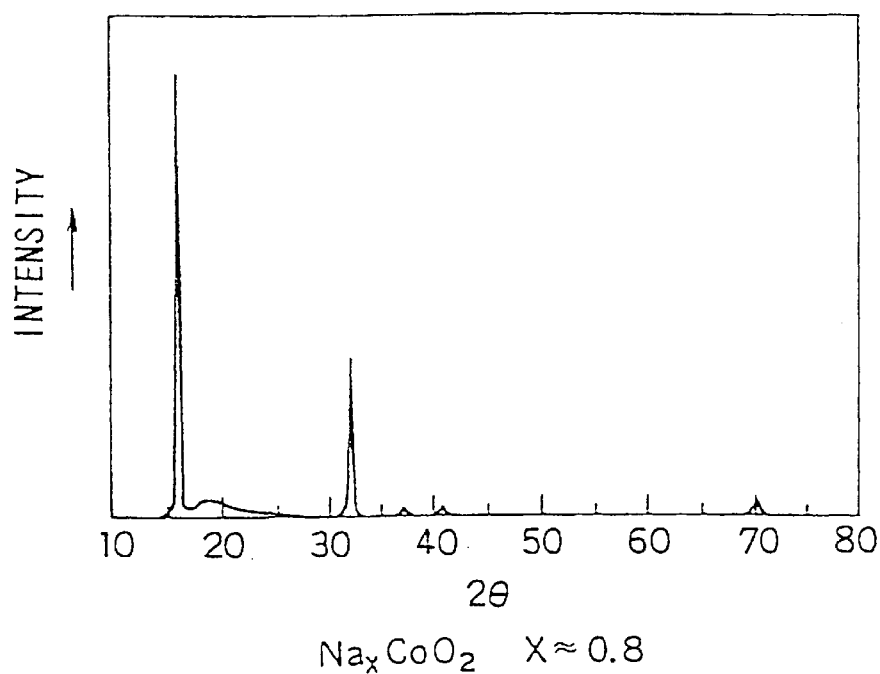
FIG. 10 shows an X ray diffraction pattern of a compound oxide of $Na_xCoO_2$ (x≈0.8) which has a layer structure.
Figure 11:
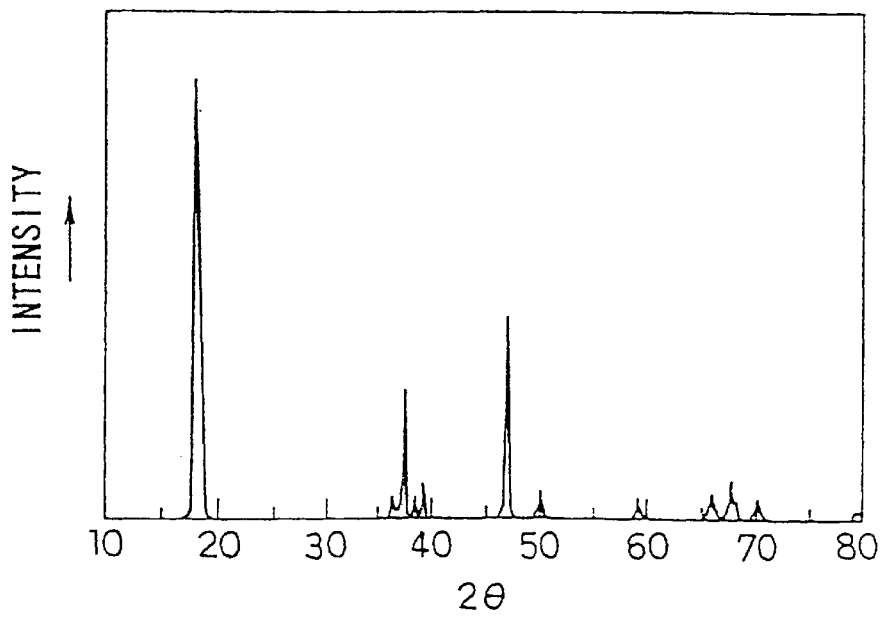
FIG. 11 shows an X ray diffraction pattern of a compound oxide of $Li_xCoO_2$ (x≈0.8) which has the layer structure.

On the other hand, the compound oxides which contain transition metal elements or alkaline metal elements have either a layer structure or a rock salt (NaCl) crystal structure. X ray diffraction patterns of such compound oxides having the layer structure are shown in FIG. 10 and FIG. 11. These diffraction patterns indicate that the compound oxides has a layer structure in which plural layers composed of constituent atoms are piled, and show peaks based on intervals of the layers. The transition metal elements include Ti, Cr, Mn, Fe, Co, Ni and Cu. The alkali metal elements include Li, Na, K, and Rb.

Although the present embodiment employs nickel-hydrogen storage batteries which use a hydrogen storage alloy for the negative electrode, the same effects can be obtained by using alkaline storage batteries which employ cadmium or zinc for the negative electrode. In addition, the compound oxide may be in the form of column or fiber, instead of powder. Furthermore, an aggregated or a sintered compound oxide powder can be used to obtain the same effects.

The alkaline storage batteries of the present invention show high capacity restoration rate after a long-term preservation at a temperature of 45° C. or higher or a deep discharge, and excellent high-temperature charge/discharge cycle life.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for producing a positive electrode of an alkaline storage battery, comprising the steps of:

providing at least one salt of a rare earth element or an alkaline earth metal element on a surface of a fiber, wherein said fiber is made of a transition metal or a resin having a layer of the transition metal on the surface thereof;

synthesizing a compound oxide containing said elements by heating said fiber; and combining said fiber with a nickel hydroxide to form a positive electrode.

2. A method for producing a positive electrode of an alkaline storage battery, comprising the steps of:

mixing nickel hydroxide as an active material and at least one transition metal powder, wherein a surface of said nickel hydroxide is coated with said transition metal;

combining at least one alkali metal salt with said transition metal-coated nickel hydroxide;

synthesizing a compound oxide containing the transition metal element and the alkali metal element by heating said nickel hydroxide until the amount of said compound oxide is in the range of 2–30 wt % of the amount of said nickel hydroxide, to form a compound oxide-nickel hydroxide mixture; and applying said mixture to a substrate to form a positive electrode.

3. A method for producing a positive electrode of an alkaline storage battery, comprising the steps of:

providing at least one salt of an alkaline earth metal element on a surface of a fiber, said fiber is made of a transition metal or a resin having a layer of the transition metal on the surface thereof;

synthesizing a metal oxide containing said alkaline earth metal element and the transition metal element by heating said fiber; and applying a mixture containing nickel hydroxide and said metal oxide by 2–30 wt % to the amount of said nickel hydroxide, to a substrate for supporting said substrate.

* * * * *